(12) United States Patent
Nguyen et al.

(10) Patent No.: US 6,648,937 B1
(45) Date of Patent: Nov. 18, 2003

(54) FAN HAVING DISPOSABLE GREASE COLLECTION CANNISTER

(75) Inventors: Tung Kim Nguyen, Overland Park, KS (US); Richard Evers, Overland Park, KS (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 10/159,645

(22) Filed: May 29, 2002

(51) Int. Cl.$^7$ .............................................. B01D 35/02
(52) U.S. Cl. ............................ 55/421; 55/423; 55/429; 55/DIG. 36; 96/147; 126/299 R; 210/691
(58) Field of Search .................... 96/108, 147, 151; 95/90; 55/385.1, 406, 423, 429, 512, DIG. 36, 421, 466; 126/299 R, 299 D, 299 E, 300, 301; 210/691, 282

(56) References Cited

U.S. PATENT DOCUMENTS

| | | | |
|---|---|---|---|
| 4,869,236 A | * | 9/1989 | Blough .................... 126/299 R |
| 5,814,115 A | * | 9/1998 | Allen et al. ................. 55/350.1 |
| 6,010,558 A | * | 1/2000 | Ackland ....................... 95/141 |
| 6,027,639 A | * | 2/2000 | Lenhart et al. ............. 210/108 |
| 6,289,555 B1 | | 9/2001 | Nguyen et al. ............... 16/235 |
| 6,368,499 B1 | * | 4/2002 | Sharpless ................... 210/164 |
| 6,468,323 B1 | * | 10/2002 | Chwala ....................... 55/490 |

FOREIGN PATENT DOCUMENTS

DE    4142477 A1  *  6/1993

OTHER PUBLICATIONS

Loren Cook Company Brochure entitled "Cook's 'Grease Terminator'" depicting prior art grease cannister (publication date at least as early as Dec. 12, 2001).

\* cited by examiner

Primary Examiner—Frank M. Lawrence
(74) Attorney, Agent, or Firm—Hovey Williams LLP

(57) ABSTRACT

A ventilation assembly (10) for venting fluid impregnated fumes and separating the fluid for collection is disclosed. The ventilation assembly (10) broadly includes a curb (12), a curb cap (14), a fan (16), and a disposable grease collection cannister (18) removably coupled to the fan (16). The fan (16) generates an airstream and separates any grease entrained in the airstream from the airstream. The separated grease is collected in the cannister (18). The entire cannister (18) can be quickly and cleanly removed, disposed of, and replaced. The cannister (18) broadly includes an open top receptacle (52) for receiving the grease, an absorbent core (54) in the receptacle (52) for absorbing and storing the grease, a funnel (56) for directing the grease into the core (54), and a lid (58) for covering the open top and removably coupling the cannister (18) to the fan (16) for removal therefrom without contacting the receptacle (52).

47 Claims, 2 Drawing Sheets

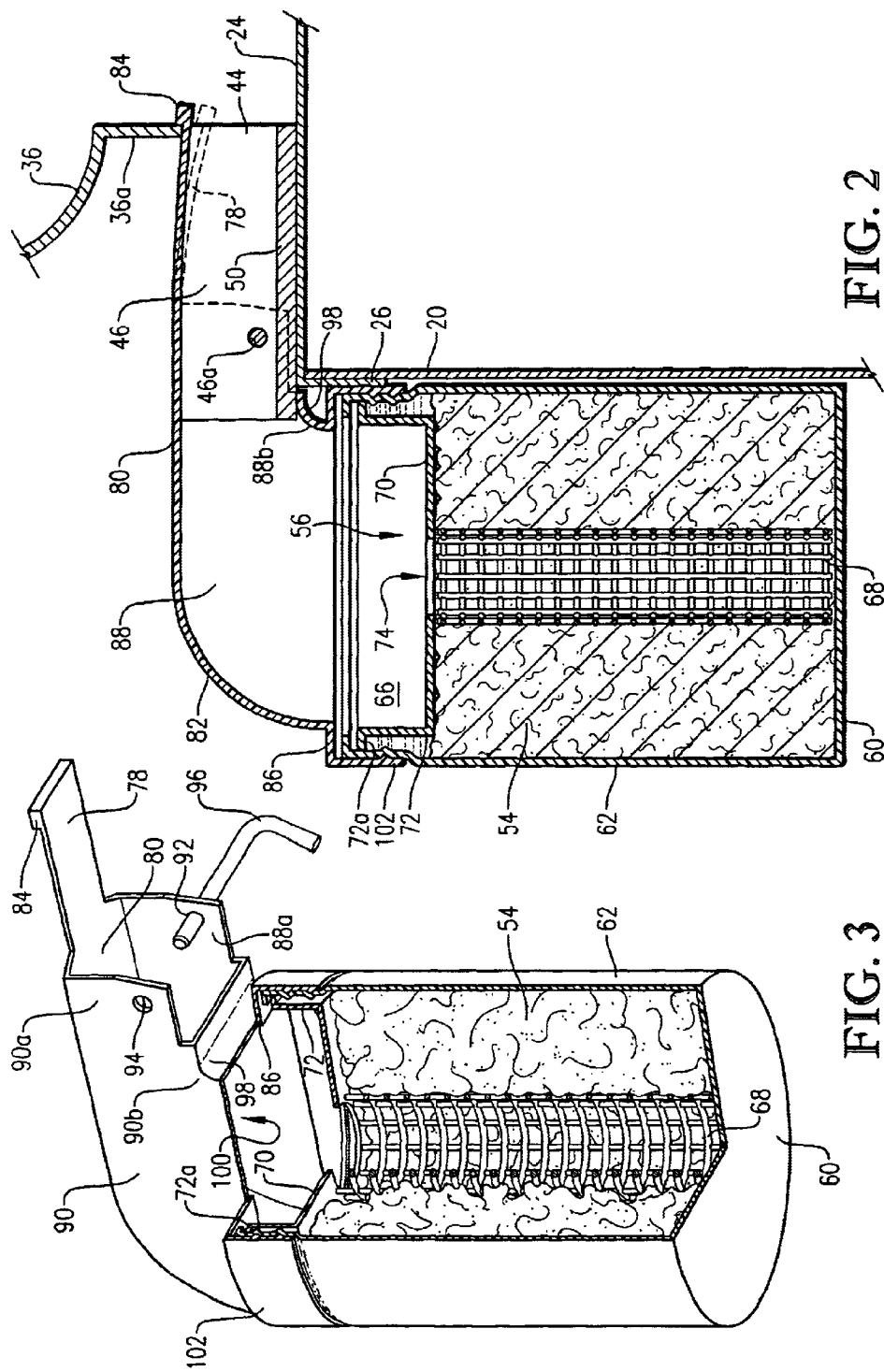

Figure 1:
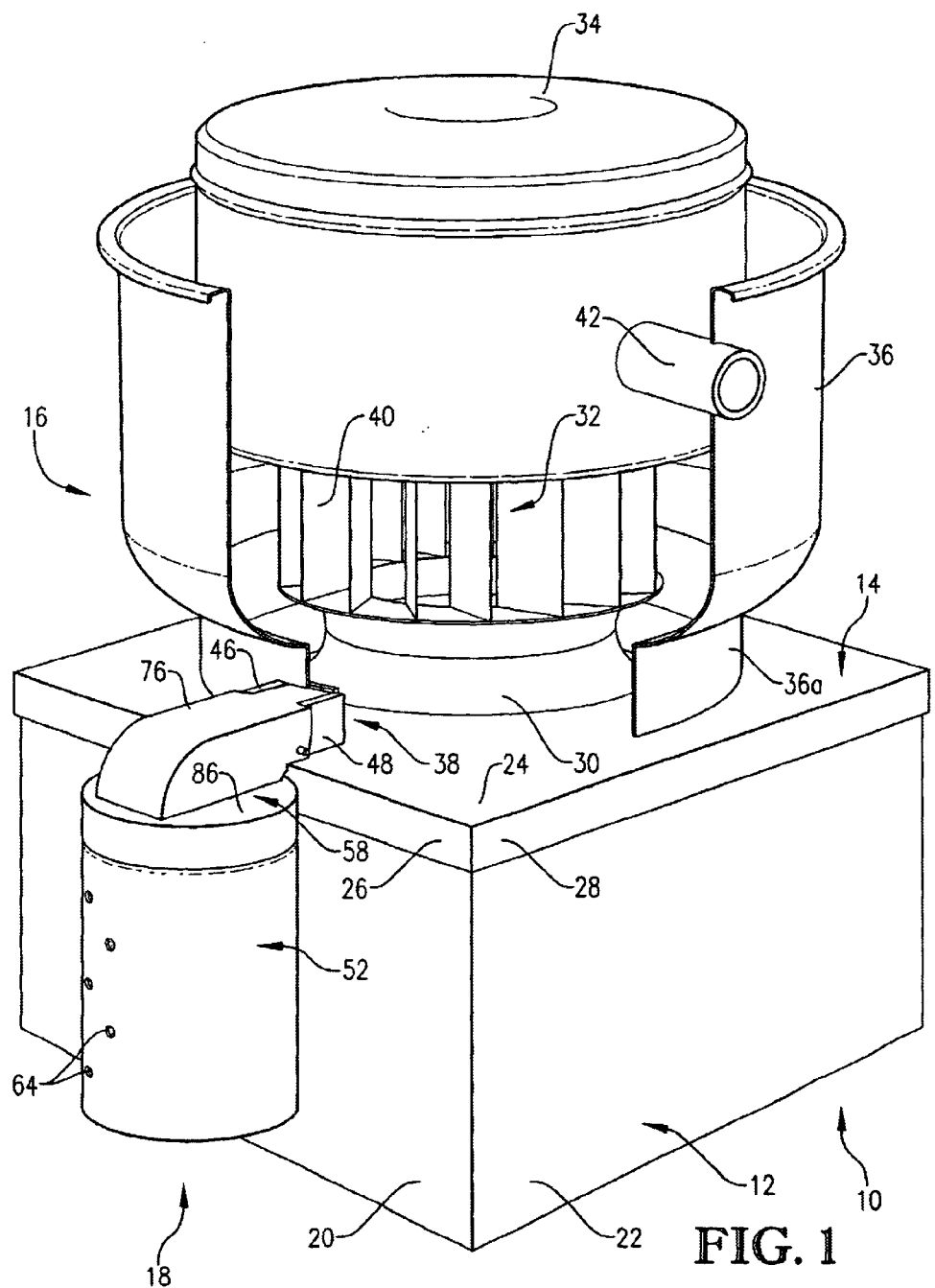

FAN HAVING DISPOSABLE GREASE COLLECTION CANNISTER

BACKGROUND OF THE INVENTION

1. Field of the Invention

The present invention relates generally to ventilation systems. More specifically, the present invention concerns a fan having a disposable fluid collection cannister for collecting fluids separated from the airstream generated by the fan. The cannister includes an absorbent core that efficiently and effectively absorbs large amounts of fluid and a coupling mechanism that permits clean and easy removal of the cannister from the fan for disposal and replacement.

2. Description of the Prior Art

In many ventilation systems, fluid becomes entrained in the airstream generated by the ventilation system. For example, a fan as typically provided above a kitchen to exhaust the undesirable fumes generated during the use of certain appliances in the kitchen (e.g., an oven, a range, etc.). The exhausted fumes are typically entrained with fluids such as grease and oil. It is desirable to separate these fluids out of the airstream and collect them for disposal. Typical exhaust fans are enshrouded in a windband. The fluid-entrained airstream is projected against the windband causing the heavier fluid to separate from the airstream and fall to the bottom of the windband. These exhaust fans are typically configured with an opening in the bottom of the windband in fluid communication with a grease trough to divert the fluid out of the windband.

It is known in the art to utilize a metal container to collect the grease draining out of the grease trough of an exhaust fan. Once the bucket becomes filled with grease, it is typically removed from the fan, emptied, and replaced on the grease trough. It is also known in the art to utilize a plastic container containing an absorbing material to collect the grease draining from the grease trough of an exhaust fan. The plastic container is threadably coupled to the grease trough and includes drainage holes to allow rain water to drain through the plastic container. These prior art grease collectors are problematic and suffer from several limitations. For example, the metal containers do not allow rain water to drain through and therefor excessive rain water can cause the grease to undesirably leak out of the container. In addition, the metal containers are typically not disposable and require the user to undesirably empty the grease from the container. The plastic containers are typically disposable, however, the user must manipulate the container and twist the container to unthread it from the grease trough. Such manipulation is undesirable because the flexible plastic compresses causing grease to be squeezed out of either the drainage holes or the top of the plastic container.

SUMMARY OF THE INVENTION

The present invention provides a ventilation system including an improved disposable grease collection cannister that does not suffer from the problems and limitations of prior art grease collectors discussed above. The improved ventilation assembly of the present invention provides an absorbent core that efficiently and effectively absorbs grease and that can be removed from the fan and disposed without undesirably squeezing or twisting the flexible container in which the absorbent core is stored.

A first aspect of the present invention concerns a disposable fluid collection cannister for collecting fluids separated from the airstream generated by an exhaust fan. The cannister broadly includes a container, a fluid absorbent core, and a coupling mechanism. The container includes an open top receptacle that presents an internal chamber adapted to contain fluid. The container further includes a cover that at least substantially covers the open-top of the receptacle. The container presents a fluid access opening adapted to be in fluidic communication with the fan when the container is coupled to the fan. The fluid absorbent core is located within the chamber of the receptacle. The coupling mechanism is operable to couple the container to the fan and permit manual removal of the container from the fan without contacting the receptacle. The coupling mechanism is adapted to non-threadably couple the container to the fan so that the container is coupled to and removed from the fan without twisting.

A second aspect of the present invention concerns a ventilation assembly broadly including an exhaust fan and a disposable fluid collection cannister. The exhaust fan includes an impeller operable to generate an airstream, a shroud operable to separate any fluid in the airstream from the airstream when the airstream engages the shroud, and a fluid conduit in fluid communication with the shroud. The disposable fluid collection cannister collects the fluid separated from the airstream generated by the exhaust fan and includes a container, a fluid absorbent core, and a coupling mechanism. The container includes an open-top receptacle that presents an internal chamber adapted to contain fluid. The container further includes a cover that at least substantially covers the open top of the receptacle. The container presents a fluid access opening in fluidic communication with the fluid conduit when the container is coupled to the fan. The fluid absorbent core is located within the chamber of the receptacle. The coupling mechanism is operable to couple the container to the fan and permit manual removal of the container from the fan without contacting the receptacle. The coupling mechanism is adapted to non-threadably couple the container to the fan so that the container is coupled to and removed from the fan without twisting.

A third aspect of the present invention concerns a disposable fluid collection cannister for collecting fluid separated from the airstream generated by an exhaust fan. The cannister broadly includes a container, a fluid absorbent core, and a coupling mechanism. The container includes a receptacle that presents an internal chamber, with the chamber being adapted to contain fluid and being in fluidic communication with the fan when the container is coupled to the fan. The fluid absorbent core is located within the chamber of the receptacle. The coupling mechanism is operable to couple the container to the fan and permit manual removal of the container from the fan without contacting the receptacle. The coupling mechanism includes a manually shiftable retention catch that is shiftable between a retention position in which the catch is operable to engage the fan and thereby retain the container on the fan, and a release position in which the catch is disengaged from the fan and permits removal of the container from the fan.

A fourth aspect of the present invention concerns a ventilation assembly that broadly includes an exhaust fan and a disposable fluid collection cannister. The exhaust fan includes an impeller operable to generate an airstream, a shroud operable to separate any fluid in the airstream from the airstream when the airstream engages the shroud, and a fluid conduit in fluid communication with the shroud. The disposable fluid collection cannister collects the fluid separated from the airstream generated by the exhaust fan and includes a container, a fluid absorbent core, and a coupling mechanism. The container includes a receptacle that presents an internal chamber, with the chamber being adapted to contain fluid and being in fluidic communication with the fluid conduit when the container is coupled to the fan. The fluid absorbent core is located within the chamber of the receptacle. The coupling mechanism is operable to couple the container to the fan and permit manual removal of the container from the fan without contacting the receptacle. The coupling mechanism includes a manually shiftable retention catch that is shiftable between a retention position in which the catch is operable to engage the fan and thereby retain the container on the fan, and a release position in which the catch is disengaged from the fan and permits removal of the container from the fan.

A fifth aspect of the present invention concerns a method of collecting fluid that is separated from the airstream generated by an exhaust fan. The method broadly includes the steps of placing an absorbent core in a container, removably coupling the core-laden container to the fan, allowing the core to at least partially absorb some fluid, and removing the fluid-absorbed core-laden container from the fan without squeezing or twisting the container.

Other aspects and advantages of the present invention will be apparent from the following detailed description of the preferred embodiments and the accompanying drawing figures.

BRIEF DESCRIPTION OF THE DRAWING FIGURES

Preferred embodiments of the present invention are described in detail below with reference to the attached drawing figures, wherein:

FIG. 1 is a perspective view of a ventilation assembly having a disposable grease collection cannister constructed in accordance with a preferred embodiment of the present invention and shown with a portion of the fans windband removed to illustrate other internal components;

FIG. 2 is an enlarged fragmentary cross-sectional view of the ventilation assembly illustrated in FIG. 1, particularly showing the disposable grease collection cannister with the catch shown in both the retention position (in solid) and the release position (in phantom); and FIG. 3 is a partial perspective view of the ventilation assembly illustrated in FIG. 1 with the fan and a portion of the disposable grease collection cannister removed to illustrate internal components of the grease collection cannister.

DETAILED DESCRIPTION OF THE PREFERRED EMBODIMENTS

Referring initially to FIG. 1, a ventilation assembly 10 constructed in accordance with the principles of a preferred embodiment of the present invention is illustrated. The ventilation assembly 10 broadly includes a curb 12, a curb cap 14, a fan 16, and a disposable grease collection cannister 18 removably coupled to the fan 16. The illustrated ventilation assembly 10 is an upblast exhaust ventilation assembly configured to be placed on the roof of a building, for example to exhaust fumes out of a kitchen, and accordingly includes the curb 12 to space the fan 16 from the roof (not shown) and the curb cap 14 to support the fan 16. However, the principles of the present invention are equally applicable to other types of ventilation systems where it is desirable to separate and collect fluids from the vented airstream (e.g., sidewall-mounted systems, etc.). The fan 16 generates an airstream and separates any grease entrained in the airstream from the airstream. The separated grease is collected in the cannister 18. The entire cannister 18 can be quickly and cleanly removed, disposed of, and replaced.

In more detail, and as shown in FIG. 1, the curb 12 is configured to space the fan 16 from the roof (not shown) and be secured thereto over a ventilation duct or opening (not shown). Particularly, the illustrated curb 12 includes four upstanding walls that present a rectangular plan shape and define an interior plenum therebetween (with only the sidewall 20 and front wall 22 being shown). The curb 12 could be variously configured (or, depending on the application, omitted entirely), for example, one or more of the walls could include vents for venting pressure between the plenum and the atmosphere. The illustrated curb 12 is open at its top and the curb cap 14 is sized for receipt over the curb 12 to enclose the plenum.

The curb cap 14 supports the fan 16 on the curb 12 and is configured to enclose the plenum so that grease-entrained fumes are drawn by the fan 16 up through the plenum and the fan 16 and vented to the atmosphere during operation. Particularly, the illustrated cap 14 includes a top support surface 24 supported on the walls of the curb 12. For purposes that will be subsequently described, the surface 24 preferably slopes slightly toward the sidewall 20 of the curb 12. The surface 24 includes a central hole (not shown) over which the fan 16 is received. The cap 14 further includes depending front, side, and rear walls (with only the side wall 26 and the front wall 28 shown) that extend downward from the surface 24 to be complementally received over the walls of the curb 12 to retain the cap 14 in a secured position on the curb 12. The illustrated cap 14 is fixedly coupled to the curb 12 (e.g., bolted, screwed, welded, etc.). However, the cap 14 could be pivotally coupled to the curb 12 to facilitate access to the plenum and the curb for cleaning and maintenance. One example of a suitable pivotal coupling is disclosed in U.S. Pat. No. 6,289,555B1, entitled ADJUSTABLE HINGE ASSEMBLY (commonly owned by the assignee of the present application), which is hereby incorporated by reference herein. The fan 16 is supported on the surface 24 of the cap 14 over the center hole therein.

The fan 16 is fixed to the top support surface 24 of the curb cap 14 over the center hole therein and generates an airstream that draws the grease-entrained fumes through the plenum, separates the grease for collection, and vents the fumes into the atmosphere. The illustrated fan 16 is a traditional centrifugal roof ventilator and broadly includes a venturi base 30, an impeller 32, a motor cover 34, a windband 36, and a grease trough 38. In more detail, the venturi base 30 is fixed to the top support surface 24. For purposes that will subsequently be described, the base 30 sealingly engages the surface 24 around the center hole therein. The base 30 functions as a venturi to direct the forced air and fumes into the impeller 32. The impeller 32 generates the airstream and includes an impeller wheel 40 drivingly coupled to a motor (not shown) by a drive assembly (not shown)(e.g., geared, shafted, etc.). The motor drives the impeller wheel 40 to generate the airstream and draw the grease-entrained fumes through the venturi base 30 and the impeller wheel 40. The motor and the drive assembly are supported in the motor cover 34 that is in turn supported on the windband 36. The motor cover 34 encases the drive components of the impeller 32 to protect them from the weather and the grease-entrained airstream that is drawn through the impeller wheel 40. In this regard, the motor cover 34 includes a bottom plate (not shown) that prevents the airstream from entering into the cover 34 and directs the airstream outward towards the windband 36. The illustrated motor cover 34 further includes a motor cooling tube 42 that communicates atmosphere onto the motor for coolant purposes. The fan 16 can utilize various features known in the art (e.g., vibration isolators, etc.) as well as various alternative configurations. However, it is important that the fan 16 include structure to separate the grease entrained in the airstream from the airstream.

In the illustrated fan 16, the windband 36, among other things, functions to separate the grease entrained in the airstream from the airstream. In more detail, the illustrated windband 36 is generally cylindrically shaped and open at the top. The windband 36 enshrouds the venturi base 30, the impeller wheel 40, and a portion of the motor cover 34 (see FIG. 1). The inside surface of the windband 36 is spaced from the base 30, the wheel 40, and the portion of the motor cover 34. The illustrated windband 36 includes a collar portion 36a at the bottom of the windband 36. The inside surface of the windband 36 slopes inwardly toward the collar portion 36a from top to bottom. The collar portion 36a sealingly engages the top support surface 24 of the curb cap 14. In operation, the rotating impeller wheel 40 draws the grease-entrained airstream through the plenum and the venturi base 30 into the wheel 40 where it is projected outwardly toward the inside surface of the windband 36. When the grease-entrained airstream contacts the inside surface of the windband 36, the relatively heavier grease falls out of the airstream. The grease drains down the sloped inside surface of the windband 36 onto the portion of the top support surface 24 of the curb cap 14 positioned between the sealed venturi base 30 and the sealed collar portion 36a. The relatively lighter airstream is directed up the sloped inside surface of the windband 36 and vented out the open top of the windband 36 into the atmosphere. The fan 16 preferably includes structure for directing the collected grease out of the bottom of the windband 36.

In the illustrated fan 16, once the grease is separated from the airstream and collected at the bottom of the windband 36 on the surface 24, the grease trough 38 functions to direct the grease out of the bottom of the windband 36. Particularly, as previously indicated, the surface 24 slopes downwardly toward the sidewall 20 of the curb 12 to naturally draw the grease in this direction. The collar portion 36a of the windband 36 presents a drainage aperture 44 (see FIG. 2) in fluid communication with the surface 24 and generally located adjacent the sidewall 20. The illustrated aperture 44 is generally rectangular in shape presenting a top edge and opposite spaced apart side edges formed in the collar portion 36a. The fourth edge, a bottom edge oppositely spaced from the top edge, is provided by the surface 24. The grease trough 38 is in fluid communication with the surface 24 via the drainage aperture 44. The trough 38 includes a pair of generally parallel, spaced apart sidewalls 46 and 48 that engage the respective side edges of the aperture 44 and extend outwardly therefrom to project over and extend beyond the sidewalls 20,26 of the curb 12 and the cap 14. For purposes that will subsequently be described, formed in the end of each of the sidewalls 46,48 distal to the windband 36 are complemental pin holes (with only pin hole 46a in sidewall 46 being shown in FIG. 2). The illustrated trough 38 further includes a bottom wall 50 extending between the sidewalls 46,48, and coextensive therewith, and extending along the surface 24. In this manner, grease that is collected at the bottom of the windband 36 on the surface 24 is directed through the aperture 44 and the trough 38 where it can drain off the outer end of the bottom wall 50 clear of the curb 12 and the curb cap 14. The structure for directing the collected grease out of the bottom of the windband 36 could utilize various alternative configurations, however, the utilized structure preferably directs the grease into a dedicated collection area that is somewhat spaced from the curb 12 and the cap 14.

Turning now to FIGS. 2 and 3, the disposable grease collection cannister 18 constructed in accordance with the preferred embodiment is removably coupled to the fan 16 for collecting the separated grease draining from the trough 38 for easy and clean removal and disposal thereof. The illustrated cannister 18 broadly includes a receptacle 52, an absorbent core 54, a funnel 56, and a lid 58. In more detail, the receptacle 52 is generally cylindrical in shape and open at the top. The receptacle 52 includes a flat, circular bottom panel 60 and a cylindrical sidewall 62 extending upward from the bottom panel 60. The walls 60,62 cooperate to define an internal chamber adapted to hold fluid. The walls 60,62 are preferably formed of a lightweight, flexible, weather-tolerant material (e.g., a polymeric plastic, a resin, a vinyl, etc.). The sidewall 62 presents the open top opposite the bottom panel 60 and, for purposes that will subsequently be described, includes external threads positioned adjacent the open top (see FIG. 2). Formed in the sidewall 62 and spaced between the open top and the bottom panel 60 are a plurality of drainage holes 64 (see FIG. 1). As will be described in detail below, the drainage holes 64 allow certain fluids (e.g., weather elements such as rain, snow, etc.) to drain out of the receptacle 52 and preferably include at least one hole located adjacent the open top. Even though the cannister 18 includes structure that covers the open top of the receptacle 52 (as will be described below), the drainage holes 64 are still preferred because, for example, rain and snow can still enter the ventilation assembly 10 through the open top of the windband 36 and drain into the internal chamber of the receptacle 52. For purposes that will become apparent below, the receptacle 52 is preferably configured and dimensioned so that when the cannister 18 is coupled to the fan 16, the receptacle 52 can be positioned adjacent the curb 12 and be suspended from the fan 16 so as not to rest on the roof.

The absorbent core 54 is housed within the internal chamber of the receptacle 52 for absorbing grease draining into the receptacle 52. The core 54 is preferably formed from a material that absorbs grease and oil but allows water to pass through. Additionally, the core 54 is preferably formed from an absorbent material capable of absorbing at least about tenfold its own weight in grease and/or oil. One suitable material is an oil specific sorbent particulate available from Xorb Corporation of Chardon, Ohio as product number 3200. The illustrated core 54 absorbs the grease that drains out of the trough 38 and into the receptacle 52. However, the core 54 allows water, for example rain water that passes into the receptacle 52, to filter through the core 54 and drain out of the drainage apertures 64. Depending on the application, once the grease collects in the core 54, it may tend to harden into a gel form. If grease were allowed to initially collect in the top of the core 54 and harden there, the hardened grease may undesirably prevent future liquid grease from draining into the receptacle 52 and being absorbed by the core 54. Accordingly, the cannister 18 preferably includes structure that facilitates funneling the grease into the receptacle 52 and the core 54 so that the bottom of the core 54 fills with grease first.

In the illustrated cannister 18, the funnel 56 funnels the grease draining into the receptacle 52 into the bottom of the internal chamber and the core 54 initially. The illustrated funnel 56 is positioned in the receptacle 52 and generally includes a dish 66 and a permeable tube 68. The dish 66 includes a generally circular panel 70 and a collar 72 upwardly extending from the panel 70. Formed in the center of the circular panel 70 is a fluid passageway opening 74. The panel 70 is preferably at least slightly sloped toward the opening 74 to funnel fluid received on the panel 70 into the opening 74. The dish 66 is dimensioned and configured to be inserted into the top of the receptacle 52 after the core 54 has been placed in the internal chamber of the receptacle 52. The dish 66 is preferably maintained in position adjacent the open top of the receptacle 52. For example, the dish 66 could be threadably received into the receptacle 52 or could simply rest on top of the core 54 and/or the tube 68. The collar 72 includes a flanged portion 72a adapted to generally prevent grease from draining between the wall 62 of the receptacle 52 and the dish 66 when the dish 66 is positioned in the top of the receptacle 52. In this regard, grease draining into the receptacle 52 is received in the dish 66 and funneled through the fluid passageway opening 74 into the internal chamber.

The permeable tube 68 is positioned in the internal chamber and extends between the circular panel 70 of the dish 66 and the bottom panel 60 of the receptacle 52. The illustrated permeable tube 68 utilizes a woven construction that is configured to allow grease to be drawn through the tube 68 into the surrounding core 54 yet sufficiently rigid to retain the core 54 and prevent it from passing into the center of the tube 68. The illustrated tube 68 is dimensioned to maintain a generally concentric relationship with the fluid passageway opening 74 to thereby define a generally unobstructed fluid passageway between the opening 74 and the bottom of the receptacle 52. In this manner, grease draining into the receptacle 52 and through the opening 74 passes to the bottom of the receptacle 52 initially where it is absorbed by the surrounding core 54. Accordingly, if this grease hardens, it does not obstruct future liquid grease from entering the fluid passageway to be absorbed by portions of the core 54 adjacent the middle or the top of the receptacle 52. As previously indicated, at least one of the drainage holes 64 is preferably located adjacent the open top of the receptacle 52. This allows water to continue to drain out of the receptacle 52 even after the receptacle becomes significantly filled with hardened grease. Although structure that funnels the grease into the bottom of the receptacle 52 initially is preferred, it is within the ambit of the present invention to utilize various alternative configurations for the receptacle and its internal chamber, including configurations that do not utilize funneling structure.

Once the core-filled internal chamber becomes filled with grease, as previously indicated, the entire cannister 18 can be easily and cleanly removed from the fan 16 for disposal and replacement. In the illustrated ventilation assembly 10, the cannister 18 is removably coupled to the fan 16 by the lid 58. In more detail, the illustrated lid 58 includes a flexible top plate 76 having a tongue portion 78, a cover portion 80, and a arcuate bow section 82 (see FIGS. 1–3). The cover portion 80 of the plate 76 is generally flat and has a generally rectangular plan shape. The cover portion 80 is dimensioned and configured so that the end of the cover portion 80 that is proximal to the fan 16 at least partly extends over a portion of the grease trough 38 when the cannister is coupled to the fan 16 and the end distal to the fan 16 extends beyond the trough 38 and over at least a portion of the receptacle 52. Additionally, the cover portion 80 has a sufficient width so that it spans both of the sidewalls 46,48 of the trough 38 when the cannister 18 is coupled to the fan 16. In this manner, the cover portion 80 is in a covering relationship with the adjacent portion of the trough 38 to prevent weather elements (e.g., rain, snow, etc.) and debris from passing into the receptacle 52. Moreover, for purposes that will subsequently be described, this covering relationship allows the sidewalls 46,48 of the trough 38 to provide an upward supporting force against the cover portion 80 against which the tongue portion 78 can be downwardly pivoted.

The tongue portion 78 of the top plate 76 extends from the cover portion 80 toward the fan 16 when the cannister 18 is coupled to the fan 16. The tongue portion 78 is generally rectangular in plan shape. The tongue portion 78 is dimensioned and configured so that the end of the tongue portion 78 proximal to the fan 16 extends into the inside of the windband 36 when the cannister 18 is coupled to the fan 16. For purposes that will subsequently be described, the tongue portion 78 has a sufficient width to enable the tongue portion 78 to slide between the sidewalls 46,48 of the trough 38. The tongue portion 78 includes a catch 84 positioned at the proximal end of the tongue portion 78 and projecting generally transversely and upwardly therefrom (see FIG. 2). The catch 84 is dimensioned and configured so that when the cannister 18 is coupled to the fan 16, the entire catch 84 is positioned inside of the windband 36. The tongue portion 78 is pivotal relative to the cover portion 80 between a retention position as shown in FIG. 2 (in solid) and a release position as shown in FIG. 2 (in phantom). When the tongue portion 78 is in the retention position, the catch 84 engages the inside surface of the collar portion 36a of the windband 36 to retain the cannister 18 on the fan 16 and to generally prevent removal of the cannister 18 from the fan 16. When the tongue portion 78 is in the release position, the catch 84 is disengaged from the windband 36 and sufficiently spaced from the top edge of the drainage aperture 44 in the collar portion 36a to permit slidable removal of the cannister 18 from the fan 16. As shown in FIG. 2, when the tongue portion 78 is in the release position, it forms an angle relative to horizontal (e.g., relative to the plane the cover portion 80 lies in) that is larger (i.e., less acute) than the angle formed relative to horizontal when the tongue portion 78 is in the retention position. Although it is within the ambit of the present invention for the angle to include zero degrees relative to horizontal when the tongue portion 78 is in the retention position, the tongue portion 78 preferably forms an angle greater than zero degrees. It is believed this enhances the retention properties of the catch 84. Additionally, although the catch 84 preferably engages the inside surface of the windband 36 when the tongue portion 78 is in the retention position, as long as the catch 84 is inside the windband 36 so that it would engage the inside surface to prevent removal if slid towards the windband 36, it need not necessarily engage this surface when the tongue portion 78 is in the retention position.

In order to couple the cannister 18 to the fan 16, the lid 58 must be slid over the grease trough 38. In order for the catch 84 to slide into the aperture 44, either the lid 58 will have to be manipulated (e.g., tilted at an angle, etc.) or the tongue portion 78 will have to be pivoted into the release position. In the illustrated cannister 18, the tongue portion 78 is manually pivoted by depressing it (e.g., by a user's digit, etc.). However, the catch 84 could be alternatively configured to automatically depress into the release position when the lid 58 is slid over the trough 38. For example, the leading edge of the catch 84 could include a cam surface sufficiently sloped to guide the catch 84 under the upper edge of the aperture 44 as the tongue portion 78 is slid into the retention position.

The top plate 76 of the lid 58 is preferably formed from a material that is sufficiently flexible to allow the tongue portion 78 to pivot into the release position yet sufficiently resilient to bias the tongue portion 78 into the retention position and maintain the tongue portion 78 in the retention position in the absence of a depression force. For example, the top plate 76 could be formed from a polymeric plastic, a resin, a vinyl, etc. As previously indicated, the cover portion 80 is supported on the sidewalls 46,48 of the trough 38 to provide an upward supporting force against the cover portion 80 against which the tongue portion 78 can be downwardly pivoted. It is believed this configuration facilitates biasing the tongue portion 78 into the retention position. Additionally, in the illustrated top plate 76, it is believed the configuration of the arcuate bow portion 82 of the top plate 76 also enhances the biasing effect on the tongue portion 78. Particularly, the arcuate bow portion 82 extends rearwardly and downwardly away from the cover portion 80 where it engages and is fixed to a cover surface 86 (as will subsequently be described in detail).

In the illustrated top plate 76, the tongue portion 78, the cover portion 80, and the arcuate bow portion 82 are integrally formed portions. The portions 78,80,82 of the top plate 76 cooperate with the cover surface 86 to cover the open top of the receptacle 52 and the trough 38 to generally prevent unwanted particles such as weather elements (e.g., rain, snow, etc.) and debris from passing into the receptacle 52. Extending between the top plate 76 and the cover surface 86 are a pair of spaced apart sidewalls 88 and 90 that also serve to prevent unwanted particles from passing into the receptacle 52. The walls 88,90 extend downwardly from the cover portion 80 and the arcuate bow portion 82. Each of the walls 88,90 include a respective trough section 88a and 90a adjacent one of the sidewalls 46,48 of the trough 38. The trough sections 88a,90a are sufficiently spaced apart to slide over the sidewalls 46,48 of the trough 38 so that the distal ends of the trough walls 46,48 are received between the trough sections 88a,90a of the lid walls 88,90 when the cannister 18 is coupled to the fan 16. In this regard, the trough sections 88a,90a of the lid walls 88,90 are sufficiently dimensioned and configured so that when the lid 58 is slid onto the trough 38, the trough sections 88a,90a do not interferingly engage the curb cap 14 (see FIG. 2).

In addition to serving a cover function, the illustrated lid walls 88,90 also facilitate a secondary locking function in addition to the catch 84 to retain the cannister 18 on the fan 16. In this regard, formed in each of the trough sections 88a,90a are pin-receiving apertures 92 and 94, respectively. The pin-receiving apertures 92,94 are complementally configured with each other and with the pin holes 46a so that when the cannister 18 is coupled to the fan 16, the apertures 92,94 align with the pin holes 46a to removably receive a pin 96. The pin 96 serves a secondary locking function in addition to the catch 84 to retain the cannister 18 on the fan 16 and prevent inadvertent removal thereof. For example, in some severe weather conditions (e.g., extreme high wind, etc.), without the pin 96 in place, the relatively lightweight cannister 18 may be blown in the wind to the point that the catch 84 is manipulated out of the retention position. The pin 96 prevents removal of the cannister 18 from the fan 16 in these conditions. Although this secondary locking function is preferred, it is not necessary.

In addition to serving the cover and locking functions, the illustrated lid walls 88,90 also function to sufficiently space the receptacle 52 from the trough 38 to facilitate effective draining and collection of grease. In this regard, each of the lid walls 88,90 include a respective shoulder section 88b and 90b that extends outwardly and downwardly from the corresponding trough section 88a,90a (see FIG. 3). In this manner, when the receptacle 52 is coupled to the lid 58 and the cannister 18 is coupled to the fan 16, the receptacle 52 is sufficiently spaced from the fan 16 to be positioned adjacent the curb 12. Additionally this configuration provides for the receptacle 52 to be spaced below the bottom wall 50 of the trough 38 to facilitate effective draining of grease from the trough into the funnel 56 and the internal chamber of the receptacle 52. In this regard, the shoulder sections 88b,90b are joined by a transversely extending splash guard 98 (see FIGS. 2 and 3). The guard 98 presents an arcuate surface positioned just below the distal end of the bottom wall 50 of the trough 38. Accordingly, grease draining out of the end of the trough 38 falls onto the splash guard 98 and is directed into the dish 66 of the funnel 56. The guard 98 is fixed at its bottom end to the cover surface 86.

As previously indicated, the cover surface 86 cooperates with the top plate 76 and the sidewalls 88,90 to cover the open top of the receptacle 52 and the trough 38 to generally prevent unwanted weather elements (e.g., rain, snow, etc.) and debris from passing into the receptacle 52. In more detail, the cover surface 86 is generally flat and circular in shape to complementally cover the generally circular open top of the receptacle 52. Formed generally in the center of the cover surface 86 is a fluid access opening 100 in fluidic communication with the drainage aperture 44 in the windband 36 and the internal chamber of the receptacle 52. The fluid access opening 100 is dimensioned to span between the bottom edges of the sidewalls 88,90, the arcuate bow portion 82, and the splash guard 98. It will be appreciated that fluid draining from the support surface 24 of the curb cap 14 flows through the aperture 44 in the windband 36 and into the grease trough 38. From the trough 38, fluid enters the cannister 18 between the sidewalls 88,90 and generally flows through a fluid access channel defined by the top plate 76, the sidewalls 88,90, the guard 98, and the fluid access opening 100 into the open top of the receptacle 52.

In the illustrated cannister 18, the receptacle 52 is coupled to the lid 58 to maintain the covering relationship of the lid 58 and to maintain proper fluid communication into the receptacle 52. As previously indicated, the receptacle 52 includes external threading adjacent the open top. The lid 58 includes a lip portion 102 extending downwardly from the cover surface 86. The lip portion 102 includes complemental internal threading to threadably and removably couple the lid 58 to the receptacle 52. In the illustrated cannister 18, the lid 58 is removably coupled to the receptacle 52 to facilitate inserting the absorbent core 54 during assembly. However, it is within the ambit of the present invention to utilize various alternative configurations that do not utilize a removable lid. For example, the cannister could be formed from two molded halves that are fused together after the core is inserted to form a unitary piece.

In the illustrated cannister 18, the coupling mechanism structure that couples the cannister 18 to the fan 16 is integrally formed in the lid 58. It will be appreciated that such a construction is advantageous in facilitating leak-free removal of the cannister 18 from the fan 16. For example, the construction of the sidewalls 88,90 provide a sufficient gripping surface that can be manipulated by the hand(s) of a user to remove the cannister 18 without squeezing the compressible receptacle 52. However, even if the receptacle 52 is squeezed during removal, the dish 66 and the fluid passageway channel defined in the lid 58 provide sufficient overflow protection to reduce leaks during removal (i.e., it is very difficult to squeeze grease out of the open top of the receptacle 52 sufficiently enough to exit out of the lid 58). However, it is within the ambit of the present invention to utilize various alternative configurations. For example, the coupling mechanism structure need not be integrally formed in the lid 58 and could include separate coupling mechanism structure comprising virtually any quick connect-type coupling. Nonetheless, it is important that the cannister be easily and quickly removable from the fan without the need to squeeze or twist the grease-laden receptacle.

Operation

In operation, the absorbent core 54 is wrapped around the permeable tube 68 of the funnel 56, the core/funnel combination is then placed in the internal chamber of the receptacle 52, and the receptacle 52 is then threaded onto the lid 58. The entire cannister 18 is then coupled to the fan 16. Particularly, the lid 58 is slid over the grease trough 38 so that the trough walls 46,48 are received within the lid sidewalls 88,90. As the lid is slid over the trough 38, the tongue portion 78 of the top plate 76 is depressed (e.g., by a digit of the user) into the release position. Once the catch 84 has cleared the drainage aperture 44 in the collar portion 36a and is inside the windband 36, the tongue portion 78 is released and biases into the retention position thereby securing the cannister 18 on the fan 16. The locking pin 96 can then be inserted through the aligned pin-receiving apertures 92,94 and pin holes 46a.

The fan 16 generates and airstream that draws grease impregnated fumes through the plenum in the curb 12, through the venturi base 30, and into the impeller wheel 40. The airstream is then projected against the windband 36 where the grease falls out and drains down onto the top support surface 24 of the curb cap 14. From the support surface 24, the grease drains through the drainage aperture 44 in the collar portion 36a and into the grease trough 38 where it initially enters the fluid passageway channel of the cannister 18. From the trough 38, the grease drains off of the distal end of the bottom wall 50 onto the splash guard 98 and through the fluid access opening 100 into the dish 66. The dish 66 funnels the grease into the fluid passageway opening 74 into the permeable tube 68 where it falls to the bottom of the internal chamber of the receptacle 52. The surrounding absorbent core 54 absorbs the grease and holds it while the grease cools and/or hardens. The core 54, however, allows any water to pass through and out of one or more of the adjacent drainage holes 64. This process continues until the internal chamber of the receptacle 52 becomes filled with grease or is filled to the point the user desires to periodically dispose of the cannister 18.

To remove the cannister 18 from the fan 16 for disposal, the locking pin 96 (if being utilized) must first be removed. The user then depresses the tongue portion 78 of the top plate 76 into the release position and simultaneously grips the lid 58 (e.g., at the sidewalls 88,90) and slides the cannister off of the grease trough 38. The entire cannister 18 can then be disposed and a fresh one reinstalled on the fan 16.

The preferred forms of the invention described above are to be used as illustration only, and should not be used in a limiting sense to interpret the scope of the present invention. Obvious modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A disposable fluid collection cannister for collecting fluid separated from the airstream generated by an exhaust fan, the cannister comprising:

a container including an open-top receptacle that presents an internal chamber adapted to contain fluid, said container further including a cover that at least substantially covers the open-top of the receptacle, said container presenting a fluid access opening adapted to be in fluidic communication with the fan when the container is coupled to the fan;

a fluid absorbent core located within the chamber of the receptacle; and a coupling mechanism operable to couple the container to the fan and permit manual removal of the container from the fan without contacting the receptacle, said coupling mechanism being adapted to non-threadably couple the container to the fan so that the container is coupled to and removed from the fan without twisting.

2. The cannister as claimed in claim 1, said receptacle including a first end panel, an opposite second end panel spaced form the first end panel, and a generally rigid wall extending between the end panels to define the internal chamber.

3. The cannister as claimed in claim 2, said container including a permeable tube positioned at least partly within the internal chamber and extending between the end panels and being spaced from the wall, said first end panel defining an aperture therein, said aperture being in fluid communication with the fluid access opening and the tube.

4. The cannister as claimed in claim 3, said internal chamber being generally cylindrical in shape, said tube being generally centrally located within the cylindrical internal chamber.

5. The cannister as claimed in claim 4, said wall presenting at least one drainage aperture formed therein.

6. The cannister as claimed in claim 5, said at least one drainage aperture being positioned in the wall adjacent the first end panel.

7. The cannister as claimed in claim 3, said absorbent core being located within the internal chamber between the wall and the tube and extending between the end panels.

8. The cannister as claimed in claim 1, said absorbent core being formed of an oil-specific sorbent particulate.

9. The cannister as claimed in claim 8, said sorbent particulate being operable to absorb at least tenfold its own weight in grease.

10. The cannister as claimed in claim 1, said coupling mechanism including a flexible member pivotal between a retention position and removal position when the cannister is coupled to the fan, said member forming a first angle relative to horizontal when in the retention position, said member forming a second angle relative to horizontal when in the removal position, said first angle being more acute than said second angle.

11. The cannister as claimed in claim 10, said coupling mechanism being dimensioned and configured so that when the cannister is coupled to the fan the coupling mechanism is slidably removable from the fan when the flexible member is in the removal position and generally prevented from being removed from the fan when the flexible member is in the retention position.

12. The cannister as claimed in claim 11, said flexible member being fixed relative to the cover.

13. The cannister as claimed in claim 11, said coupling mechanism further including a locking pin removably coupled relative to the flexible member when the cannister is coupled to the fan so that when the pin is coupled relative to the flexible member, the coupling mechanism is generally prevented from being slidably removed from the fan.

14. The cannister as claimed in claim 1, said cover being threadably coupled to the receptacle.

15. A ventilation assembly comprising:
an exhaust fan including an impeller operable to generate an airstream, a shroud operable to separate any fluid in the airstream from the airstream when the airstream engages the shroud, and a fluid conduit in fluid communication with the shroud; and
a disposable fluid collection cannister for collecting the fluid separated from the airstream generated by the exhaust fan including a container, a fluid absorbent core, and a coupling mechanism,
said container including an open-top receptacle that presents an internal chamber adapted to contain fluid,
said container further including a cover that at least substantially covers the open-top of the receptacle,
said container presenting a fluid access opening in fluidic communication with the fluid conduit when the container is coupled to the fan,
said fluid absorbent core being located within the chamber of the receptacle,
said coupling mechanism operable to couple the container to the fan and permit manual removal of the container from the fan without contacting the receptacle,
said coupling mechanism being adapted to non-threadably couple the container to the fan so that the container is coupled to and removed from the fan without twisting.

16. The ventilation assembly as claimed in claim 15, said fluid conduit comprising a fluid collection surface generally located at the bottom of the shroud and an aperture defined in the shroud generally adjacent the surface and fluidly communicating with the fluid access opening and the surface.

17. The ventilation assembly as claimed in claim 16, said coupling mechanism including a flexible plate slidably received in and slidably removed from the aperture in the shroud.

18. The ventilation assembly as claimed in claim 17, said plate including a flange that engages the inside surface of the shroud when the plate is slidably received in the aperture in the shroud to generally prevent slidable removal of the coupling mechanism from the shroud.

19. The ventilation assembly as claimed in claim 18, said plate pivotal into and out of a removal position wherein the flange is disengaged from the inside surface of the shroud to generally permit slidable removal of the coupling mechanism from the shroud when the plate is received in the aperture in the shroud.

20. The ventilation assembly as claimed in claim 19, said plate biased out of the removal position when the coupling mechanism is received in the aperture in the shroud.

21. The ventilation assembly as claimed in claim 18, said plate further including a cover section extending opposite the flange,
said cover section of the plate being fixed relative to the cover of the container.

22. The ventilation assembly as claimed in claim 17, said fluid conduit including a trough fluidly communicating the surface with the fluid access opening via the aperture,
said trough including a pair of spaced apart trough walls extending from the opposite sides of the aperture.

23. The ventilation assembly as claimed in claim 22, said coupling mechanism further including a pair of spaced apart sidewalls extending between the plate and the cover and being configured to receive the trough walls therebetween.

24. The ventilation assembly as claimed in claim 23, each of said sidewalls being fixed relative to the cover and dimensioned to space the container from the surface so that the chamber is at least in part positioned below the surface when the cannister is coupled to the fan.

25. The ventilation assembly as claimed in claim 23, said coupling mechanism further including a locking pin removably received through the sidewalls and the trough walls so that when the pin is received therein, the coupling mechanism is generally prevented from being slidably removed from the aperture in the shroud.

26. A disposable fluid collection cannister for collecting fluid separated from the airstream generated by an exhaust fan, the cannister comprising:
a container including a receptacle that presents an internal chamber, with the chamber being adapted to contain fluid and being in fluidic communication with the fan when the container is coupled to the fan;
a fluid absorbent core located within the chamber of the receptacle; and
a coupling mechanism operable to couple the container to the fan and permit manual removal of the container from the fan without contacting the receptacle,
said coupling mechanism including a manually shiftable retention catch that is shiftable between a retention position in which the catch is operable to engage the fan and thereby retain the container on the fan, and a release position in which the catch is disengaged from the fan and permits removal of the container from the fan.

27. The cannister as claimed in claim 26, said receptacle being generally open at the top, said container including a cover that at least substantially covers the open top of the receptacle.

28. The cannister as claimed in claim 26, said receptacle being defined by a thin, flexibly squeezable wall.

29. The cannister as claimed in claim 28, said wall presenting at least one drain hole defined therein.

30. The cannister as claimed in claim 26, said coupling mechanism including a flexible element, said catch being fixed to the flexible element.

31. The cannister as claimed in claim 30, said flexible element forming a first angle relative to horizontal when the catch is in the retention position,
said flexible element forming a second angle relative to horizontal when the catch is in the release position,
said first angle being more acute than said second angle.

32. The cannister as claimed in claim 30, said catch projecting transversely from the flexible element.

33. The cannister as claimed in claim 26, said absorbent core being formed of an oil-specific sorbent particulate.

34. The cannister as claimed in claim 33, said sorbent particulate being operable to absorb at least tenfold its own weight in grease.

35. A ventilation assembly comprising an exhaust fan including an impeller operable to generate an airstream, a shroud operable to separate any fluid in the airstream from the airstream when the airstream engages the shroud, and a fluid conduit in fluid communication with the shroud; and a disposable fluid collection cannister for collecting fluid separated from the airstream generated by the exhaust fan including a container, a fluid absorbent core, and a coupling mechanism, said container including a receptacle that presents an internal chamber, with the chamber being adapted to contain fluid and being in fluidic communication with the fluid conduit when the container is coupled to the fan, said fluid absorbent core being located within the chamber of the receptacle, said coupling mechanism operable to couple the container to the fan and permit manual removal of the container from the fan without contacting the receptacle, said coupling mechanism including a manually shiftable retention catch that is shiftable between a retention position in which the catch is operable to engage the fan and thereby retain the container on the fan, and a release position in which the catch is disengaged from the fan and permits removal of the container from the fan.

36. The ventilation assembly as claimed in claim 35, said fluid conduit comprising a fluid collection surface generally located at the bottom of the shroud and an aperture defined in the shroud generally adjacent the surface and fluidly communicating with the chamber and the surface.

37. The ventilation assembly as claimed in claim 36, said coupling mechanism including a flexible plate slidably received in and slidably removed from the aperture in the shroud.

38. The ventilation assembly as claimed in claim 37, said catch being fixed to the plate so as to project transversely therefrom, said catch engaging the inside surface of the shroud when the plate is slidably received in the aperture in the shroud and the catch is in the retention position to generally prevent slidable removal of the coupling mechanism from the shroud.

39. The ventilation assembly as claimed in claim 38, said catch being biased into the retention position when the plate is received in the aperture in the shroud.

40. The ventilation assembly as claimed in claim 38, said plate presenting generally opposite ends, said catch being fixed to one end of the plate, the other end of the plate being fixed relative to the container.

41. The ventilation assembly as claimed in claim 37, said fluid conduit including a trough fluidly communicating the surface with the chamber via the aperture, said trough including a pair of spaced apart trough walls extending from opposite sides of the aperture.

42. The ventilation assembly as claimed in claim 41, said coupling mechanism further including a pair of spaced apart sidewalls extending between the plate and the surface and being configured to receive the trough walls therebetween.

43. The ventilation assembly as claimed in claim 42, each of said sidewalls being fixed relative to the container and dimensioned to space the container from the surface so that the chamber is at least in part positioned below the surface when the cannister is coupled to the fan.

44. The ventilation assembly as claimed in claim 42, said coupling mechanism further including a locking pin removably received through the sidewalls and the trough walls so that when the pin is received therein, the plate is generally prevented from being slidably removed from the aperture in the shroud.

45. A method of collecting fluid that is separated from the airstream generated by an exhaust fan, the method comprising the steps of:

(a) placing an absorbent core in a container;

(b) removably coupling the core-laden container to the fan;

(c) allowing the core to at least partially absorb some fluid; and (d) removing the fluid-absorbed core-laden container from the fan without squeezing or twisting the container.

46. The method as claimed in claim 45, step (b) including the step of sliding a manually shiftable retention catch into the fan so that the catch engages the fan to thereby retain the container on the fan.

47. The method as claimed in claim 46, step (d) including the steps of shifting the retention catch into a release position in which the catch is disengaged from the fan to permit removal of the container from the fan and sliding the catch out of the fan to thereby remove the container from the fan.

\* \* \* \* \*